(12) United States Patent
Deakin et al.

(10) Patent No.: US 8,813,140 B2
(45) Date of Patent: Aug. 19, 2014

(54) CONTENT RETRIEVAL FOR DIGITAL MEDIA RECORDER DEVICES

(75) Inventors: Oliver M. Deakin, Southampton (GB); Neil R. Hardman, Romsey (GB); Lucas W. Partridge, Romsey (GB); William Smith, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 13/414,762

(22) Filed: Mar. 8, 2012

(65) Prior Publication Data

US 2013/0239153 A1 Sep. 12, 2013

(51) Int. Cl.
*H04N 7/173* (2011.01)
*H04N 21/231* (2011.01)

(52) U.S. Cl.
CPC .............................. *H04N 21/23106* (2013.01)
USPC .................................. 725/89; 725/88; 725/96

(58) Field of Classification Search
CPC ............ H04N 21/83; H04N 21/23103; H04N 21/23106; H04N 21/2183
USPC ...................................... 725/89, 96, 134, 142
See application file for complete search history.

(56) References Cited

U.S. PATENT DOCUMENTS

| | | | |
|---|---|---|---|
| 6,901,603 B2 | 5/2005 | Zeidler et al. | |
| 7,055,167 B1 | 5/2006 | Masters | |
| 7,146,094 B1 | 12/2006 | Boyle | |
| 7,526,184 B1 | 4/2009 | Parkinen et al. | |
| 8,474,003 B2* | 6/2013 | Chen et al. | 725/134 |
| 2003/0208612 A1* | 11/2003 | Harris et al. | 709/231 |
| 2004/0128343 A1* | 7/2004 | Mayer | 709/203 |
| 2005/0097624 A1* | 5/2005 | Salo et al. | 725/136 |
| 2005/0155079 A1* | 7/2005 | Chen et al. | 725/115 |
| 2006/0026663 A1* | 2/2006 | Kortum et al. | 725/134 |
| 2006/0230176 A1* | 10/2006 | Dacosta | 709/235 |
| 2006/0271977 A1* | 11/2006 | Lerman et al. | 725/88 |
| 2007/0031111 A1* | 2/2007 | Thiagarajan et al. | 386/83 |
| 2008/0069539 A1 | 3/2008 | Oh | |

(Continued)

FOREIGN PATENT DOCUMENTS

| EP | 1504592 B1 | 12/2009 |
|---|---|---|
| WO | WO 03/103293 | * 12/2003 |

OTHER PUBLICATIONS

Motorola et al., "Enhancing Remote Notifications for Television Programme Recommendations", Oct. 31, 2007, IP.com [online], [retrieved on Jan. 31, 2012]. Retrieved from: Prior Art Database, IP.com number: IPCOM000159851D.

*Primary Examiner* — Junior Mendoza
(74) *Attorney, Agent, or Firm* — Daniel R. Simek

(57) ABSTRACT

A computer receives broadcast content through a receiver and receives a request from a user to record a segment of broadcast content. The computer determines whether metadata associated with the segment of broadcast content includes a location from which the segment can be retrieved at a subsequent time. Responsive to determining that the metadata includes the location from which the segment can be retrieved, the computer records a first portion of the segment of broadcast content, the computer storing the first portion of the segment of broadcast content in a database. Responsive to a request to play the segment of broadcast content, the computer retrieves the first portion of the segment of broadcast content from the database and plays the first portion of the segment of broadcast content. The computer retrieves a remaining portion of the segment of broadcast content not previously recorded through a network connection.

24 Claims, 6 Drawing Sheets

(56) References Cited

U.S. PATENT DOCUMENTS

| | | |
|---|---|---|
| 2008/0152310 A1 | 6/2008 | Miyagoshi |
| 2008/0209481 A1* | 8/2008 | Barrett ............................ 725/91 |
| 2010/0195972 A1 | 8/2010 | Casagrande |
| 2010/0218223 A1* | 8/2010 | Simpson et al. ................ 725/58 |
| 2011/0197216 A1* | 8/2011 | Sie et al. ......................... 725/25 |
| 2011/0307929 A1* | 12/2011 | Youssefmir et al. ............ 725/89 |

* cited by examiner

CONTENT RETRIEVAL FOR DIGITAL MEDIA RECORDER DEVICES

FIELD OF THE INVENTION

The present invention relates generally to broadcast media. More particularly, the present invention relates to content retrieval for digital media recorder devices.

BACKGROUND

Media recording devices such as Personal Video Recorders (PVRs) and Digital Video Recorders (DVRs) are very popular for recording television programs to an integrated or external storage device. A PVR or DVR is attached to a monitor or television set and receives broadcast signals through a coaxial cable, satellite dish, or antenna. A PVR or DVR can also be integrated within a television set. Once the video stream from a provider reaches a cable box and is decrypted into a video format (if required), the broadcast content is able to be recorded by the PVR or DVR. When the recording device is programmed to record a video stream, the recording device saves the content as a video file on the storage device. Additionally, the recording device indexes data to indicate where the file is located, and metadata that consists of the specific information relating to the recorded content. The indexed content is then available for a user to watch at their leisure.

However, PVRs and/or DVRs are limited by the capacity of storage devices associated with the corresponding PVR and/or DVR. Users who have a limited time to watch recorded programs, or record a lot of content, are continually notified that the storage device is running out of storage space. The limited amount of storage in the storage device burdens the user with quickly deciding which existing content to delete in order to create space to record further content. Situations like this lead to a large portion of the storage device to be utilized for content that is never viewed by the user.

At the present time, some known ways of dealing with limited storage capacity are content compression and streaming content. Compressing the content means more content can be stored. However, the storage device will still eventually run out of space. Streaming content from the provider or the internet means that there is no content stored locally on a storage device. When streaming content, the user has to remember to watch the program before it becomes unavailable. Also, the bandwidth of the network used to stream the content may limit the viewing quality of the streaming content or cause the content to pause intermittently, or buffer, while the remainder of the content is being downloaded.

SUMMARY

Embodiments of the present invention provide a system, method, and program product for recording and replaying broadcast content. A computer receives broadcast content through a receiver and receives a request from a user to record a segment of broadcast content. The computer determines whether metadata associated with the segment of broadcast content includes a location from which the segment can be retrieved at a subsequent time. Responsive to determining that the metadata includes the location from which the segment can be retrieved, the computer records a first portion of the segment of broadcast content, the computer storing the first portion of the segment of broadcast content in a database. The computer receives a request from the user to play the segment of broadcast content. Responsive to the request to play the segment of broadcast content, the computer retrieves the first portion of the segment of broadcast content from the database and plays the first portion of the segment of broadcast content. The computer retrieves a remaining portion of the segment of broadcast content not previously recorded through a network connection.

DETAILED DESCRIPTION

Figure 1:
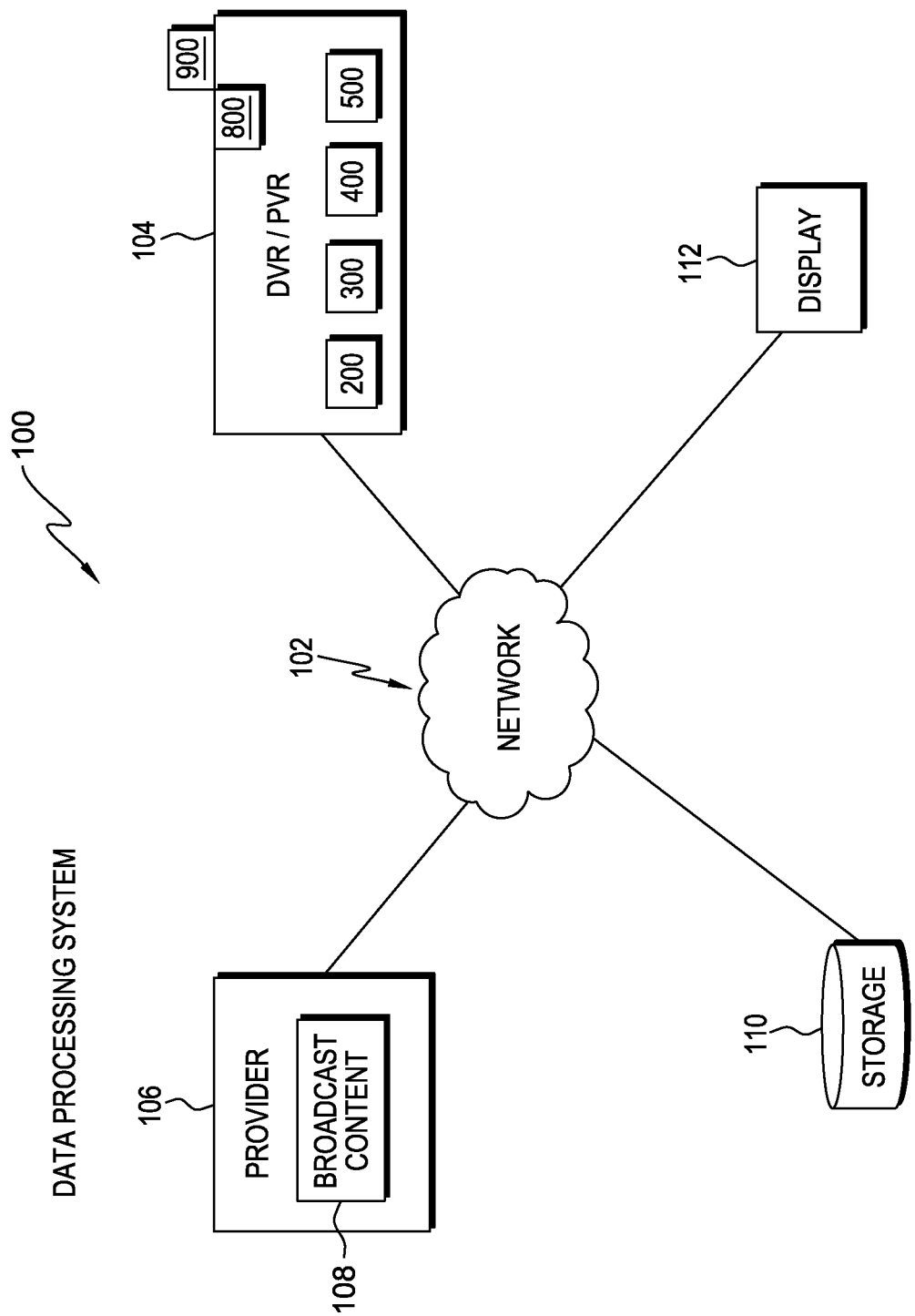
FIG. 1 is a pictorial representation of a data processing system for recording and replaying broadcast content in accordance with an embodiment of the present invention.

The present invention will now be described in detail with reference to the Figures. FIG. 1 illustrates a data processing system 100 in accordance to one embodiment of the present invention.

Data processing system 100 includes a provider 106, digital video recorder (DVR) 104, storage device 110, and display 112 connected through network 102. DVR 104 represents a form of a digital media recording device that receives and records content to an integrated or external storage device. Examples of DVR 104 may include a personal video recorder (PVR), a DVR/PVR which is integrated with a cable box, or a stand alone unit, and other embodiments of digital media recording devices. DVR 104 includes broadcast content storage program 200 for receiving and downloading broadcast content from provider 106. In this example, DVR 104 also includes broadcast content display program 300 for displaying previously recorded content from provider 106. Also, DVR 104 includes broadcast content expiration program 400 for determining whether the portions of content on the storage device of DVR 104 have an approaching download availability expiration time. In another example, DVR 104 also includes broadcast content replacement program 500 for determining if the completely recorded programs on the storage device of DVR 104 are now available for download.

The programs described in FIGS. 2, 3, 4, and 5 may be stored on DVR 104 in the form of programs on DVR 104 computing system. However, in other examples, the programs may be stored on remote storage devices, servers, and other methods.

In one embodiment, data processing system 100 is comprised of network 102 which provides communication between devices and content, such as, for example computers, DVRs, PVRs, and other devices connecting to a cable, radio, internet, or other media provider. Network 102 may include connections such as wiring, wireless communication links, fiber optic cables, or other forms of communication. Network 102 may access content through a plurality of methods, including but not limited to: open source to connect to standard programming, closed source to connect to cable programming from a provider, as well as other methods to connect to other formats. In the depicted example, provider 106 administers broadcast content 108 which may represent, but is not limited to: an incoming data stream from provider 106 consisting of television and radio signals. Further, provider 106 may administer other data, such as applications, images, metadata, and other information pertaining to the broadcast content 108. Storage device 110 represents any type of storage device that is capable of storing data in a structured or unstructured format, which allows broadcast content 108 and other data stored by providers 106 to be available for download through network 102. Also, storage device 110 is not limited to a single location from a single provider, storage device 110 can comprise multiple providers storing broadcast content 108 on a plurality of storage units. Display 112 may be a television, monitor, or other display which is connected to DVR 104 through network 102 and is used to display inputs from DVR 104 and provider 106. The connection between display 112 and DVR 104 may be through, but is not limited to: audio/visual input connections, wireless connectivity, or other forms of connectivity.

In the depicted example, DVR 104 is a representation of a data recording device in which computer usable program code or instructions implementing the processes of the illustrative embodiments may be located. Example components included in DVR 104 include a storage device, a computing system, and input/output connections. Storage device of DVR 104 may be used to store broadcast content 108 and data being watched and recorded. Storage device of DVR 104 may include a plurality of storage devices such as hard drives, flash memory, memory cards, or other forms of data storage. Examples of computing systems provide the ability to decode received content, record and save desired content, as well as other processes. The input/output connections allow communication with outside devices through network 102. In an example of DVR 104 operation, a signal including broadcast content 108 from provider 106 is received by DVR 104, and is decoded by DVR 104. DVR 104 sends the broadcast content to the storage device of DVR 104 and converts the broadcast content into a format that allows the content to be viewed on display 112.

DVR 104 allows for instant playback of broadcast content 108, which is accomplished when broadcast content 108 currently being broadcast is temporarily stored on a storage device, such as storage device of DVR 104, so that broadcast content can be instantly replayed at a user's discretion. An exemplary DVR 104 is operated by a customizable operating system which allows users to view the schedule of broadcast content 108, and decide which content the user wants to record. When DVR 104 receives a request to record content, the computing system of DVR 104 retrieves a segment of content from broadcast content 108 and records and stores the segment of broadcast content within the storage device. User is then allowed to access and play stored content when the user desires to view stored content. The stored content may also be removed from the storage device of DVR 104 at the discretion of the user.

In the depicted example of FIG. 1, DVR 104 can access broadcast content 108 from provider 106, and content available for download located on storage device 110 through network 102. Display 112 shows content from provider 106, DVR 104, and content available for download located on storage device 110, through accessing network 102. This example of a data processing system 100 may be implemented as a number of different types of networks, for example an internet connection, local area network (LAN) connection, an intranet network, as well as others. Data processing system 100 may also include additional providers 106 and receivers not depicted in the example figure. It should be noted that FIG. 1 is only intended as an example and not as an architectural limitation for different embodiments of the invention.

Figure 2:
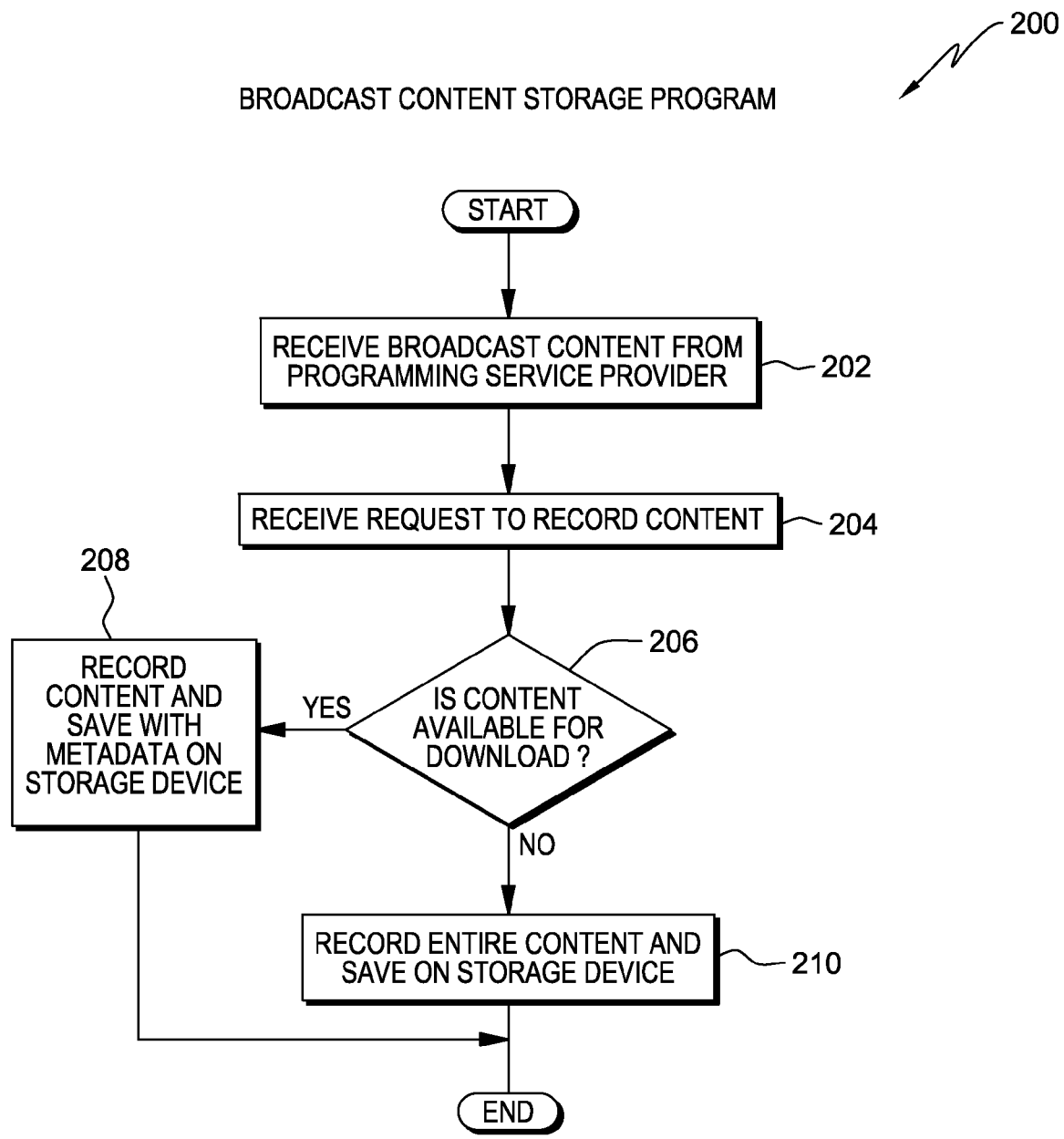
FIG. 2 is a flowchart depicting the steps of a program for recording and storing broadcast content in accordance with an embodiment of the present invention.

FIG. 2 is a flowchart of broadcast content storage program 200. In step 202, broadcast content storage program 200 receives broadcast content 108 from provider 106. Broadcast content storage program 200 receives a user request to record a segment of broadcast content (step 204). Then broadcast content storage program 200 determines whether metadata associated with the segment of broadcast content 108 to be recorded in step 204 contains a location from which the segment of broadcast content 108 can be retrieved at a later time (decision step 206). If broadcast content storage program 200 does find metadata containing the download location in decision step 206, broadcast content storage program 200 records at least a portion of the broadcast content and saves it on the storage device of DVR 104 along with the associated metadata for the content (step 208). If broadcast content storage program 200 does not find metadata containing the location in decision step 206, broadcast content storage program 200 records the entire segment of broadcast content and saves it on the storage device of DVR 104 (step 210).

In some examples, broadcast content storage program 200 facilitates better utilization of the storage space available on known examples of storage devices of known DVRs 104. In current iterations of DVRs 104, the entire segment of broadcast content is stored on the storage devices of DVRs 104, which causes storage devices to fill up, and makes user delete previously recorded content in order to record new content. An embodiment of this invention allows utilization of storage space by storing the beginning portion of content compared to the entire segment. Therefore, the user will be able to store more segments related to different broadcast content on DVR 104 and can avoid having to delete content before the user has a chance to view it. In another example, the user may have already seen the beginning portion of content. In this case, the user may define when to begin recording the segment of broadcast content. This means that the portion of broadcast content saved to the storage device of DVR 104 will begin at the point of the segment of broadcast content that the user stopped watching. In step 204, requests to record broadcast content may be pre-programmed and are not limited to DVR 104 being powered on and the user requesting to record a segment of broadcast content while it is airing. In an example, while displaying stored content, DVR 104 determines that content has been already viewed, and deletes the previously viewed content while displaying the remaining portion of content. In an example, DVR 104 may delete the portion of the content which is more than 5 minutes (to allow for rewinding) previous to the point which the user is viewing. In this example, the content stored on the storage device of DVR 104 would include the content 5 minutes previous to the current point of the content, and the remaining portion of content being downloaded. The previous example may exist in the form of an option which the user may choose to use with either content that is stored in its entirety (step 210), or as a portion of content (step 208).

Figure 3:
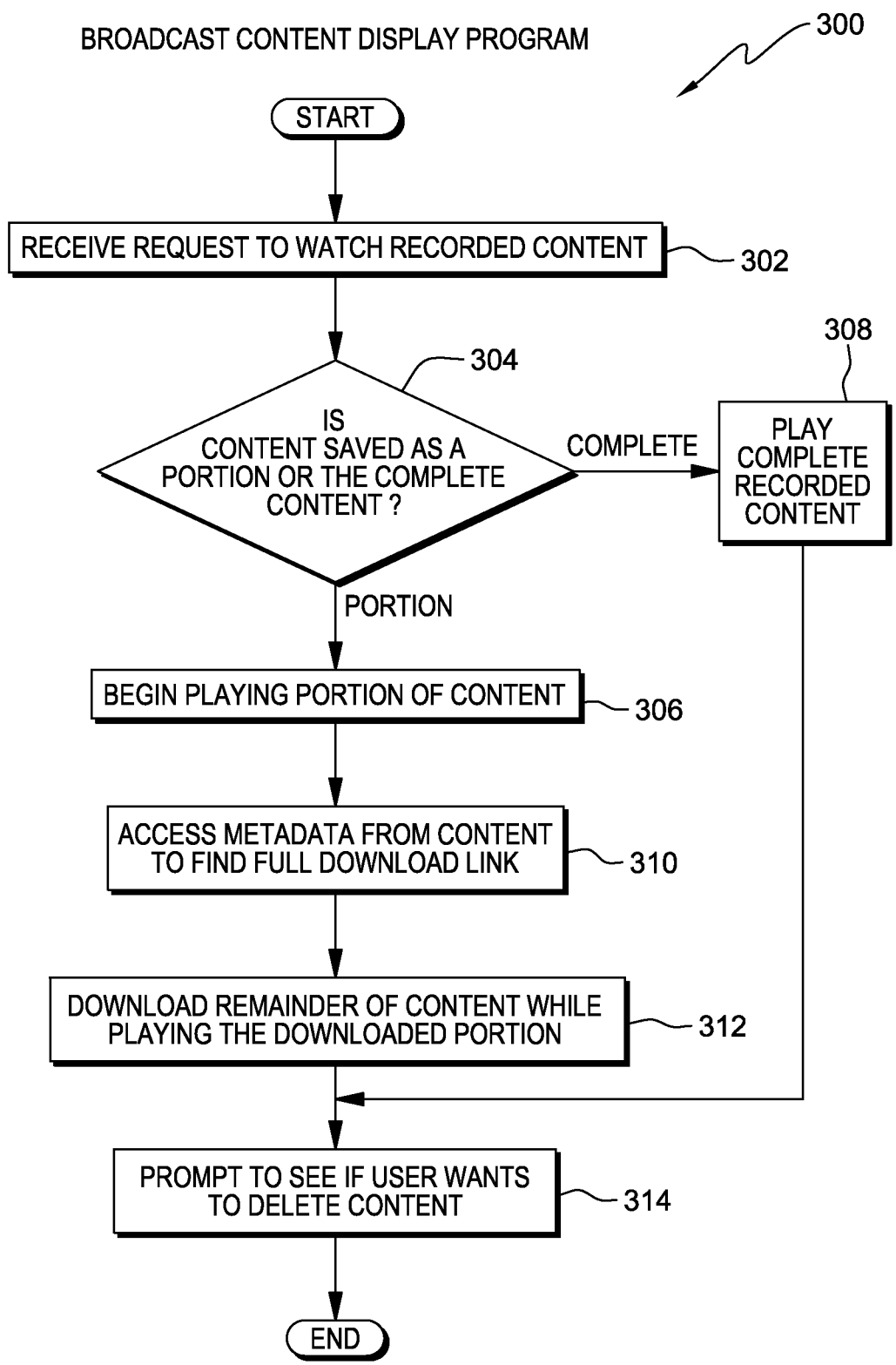
FIG. 3 is a flowchart depicting the steps of a program for displaying previously recorded broadcast content in accordance with an embodiment of the present invention.

FIG. 3 is a flowchart of broadcast content display program 300. Broadcast content display program 300 receives a request to play previously recorded content, responsive to user input (step 302). Broadcast content display program 300 determines whether or not the content the user is requesting to view (from step 302) is stored on the storage device of DVR 104 in its entirety, or only the beginning portion (decision block 304). If the content from step 302 is stored in its entirety, then broadcast content display program 300 plays the complete content for user (step 308). If only the beginning portion of the content from step 302 is stored on the storage device, then broadcast content display program 300 begins playing the stored portion of content (step 306). While the beginning portion of content from step 306 is playing, broadcast content display program 300 accesses metadata associated with the portion of broadcast content to find a link to download a remaining portion of content (step 310). Broadcast content display program 300 uses the download link obtained in step 310 to download the remaining portion of content from its storage device 110 through network 102 (step 312). The remaining portion of the content is downloaded while the user is viewing the beginning portion of content (from step 306), and is then played so that the viewing quality of the content displayed for the user is not interrupted. Once the user completes viewing the content determined in decision step 304, broadcast content display program 300 has an option to prompt the user to make a determination on whether or not to remove the content from the storage device (step 314).

In some examples, broadcast content display program 300 allows users to watch content stored on the storage device of DVR 104. When only the beginning portion of a segment of broadcast content is stored, the remaining portion will be retrieved in order to watch the content in its entirety. To reduce the likelihood of an interruption or difference in viewing quality, the complete segment of broadcast content is played in a manner such that the downloaded subsequent content is played after the previously recorded beginning portion. In an embodiment of the invention, the size of the beginning portion of content downloaded to the storage device is adjusted in accordance to the speed of the user's connection to storage device 110 through network 102. The faster the connection through network 102, the smaller the beginning portion of content stored on the storage device of DVR 104. Changing the size of the beginning portion of content downloaded to the storage device depending upon the connection speed may allow an increased amount of content to be stored on the storage device of DVR 104.

Figure 4:
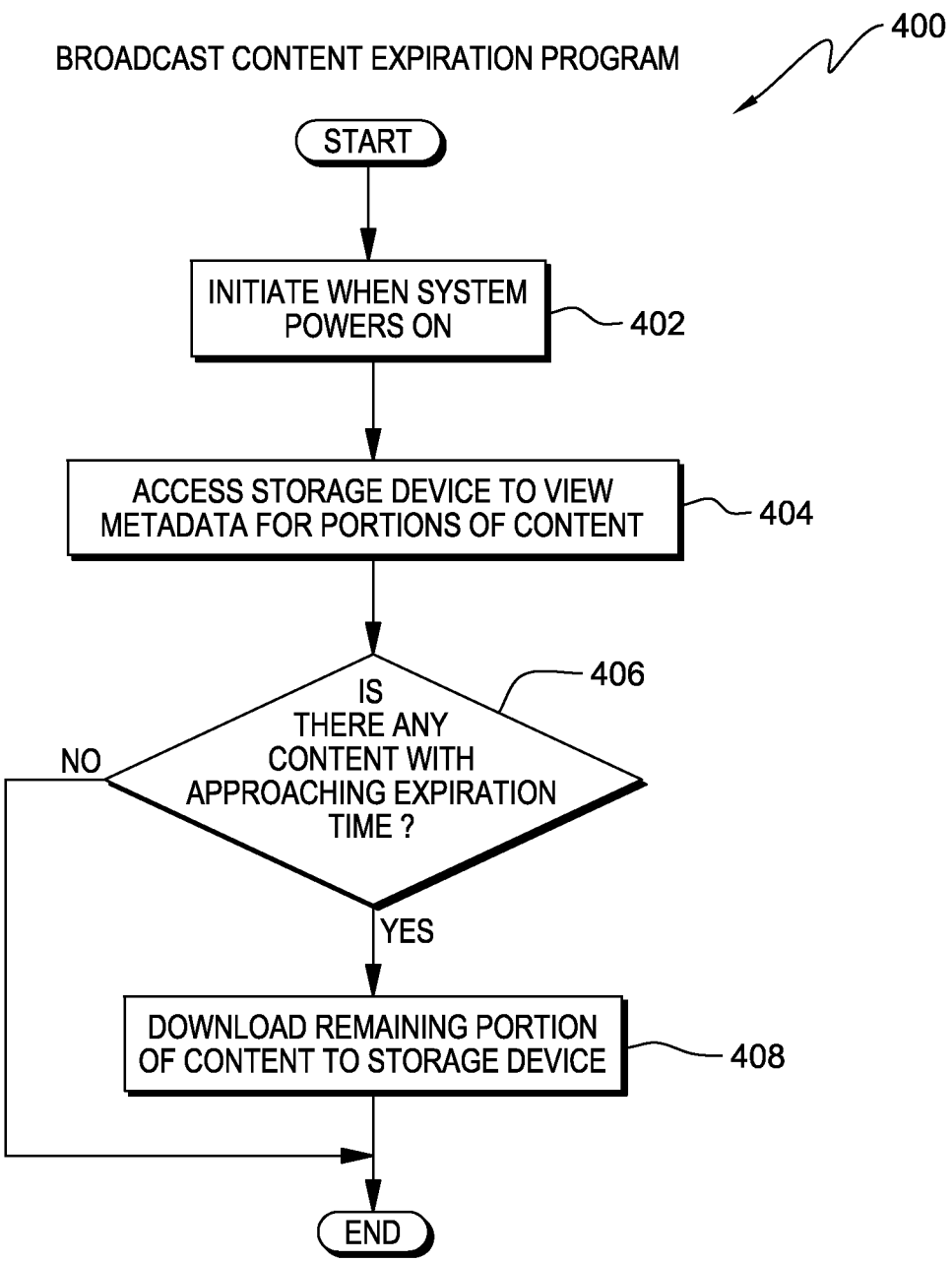
FIG. 4 is a flowchart depicting the steps of a program for downloading expiring broadcast content in accordance with an embodiment of the present invention.

FIG. 4 is a flowchart of broadcast content expiration program 400. In one example, broadcast content expiration program 400 initiates when DVR 104 is powered on (step 402). In other examples, broadcast content expiration program 400 initiates in response to user input. Once DVR 104 is powered on, metadata pertaining to stored portions of content is accessed by broadcast content expiration program 400 (step 404). Broadcast content expiration program 400 checks to see if any of the content from step 404 has an approaching expiration time for download (decision step 406). If broadcast content expiration program 400 determines that the content from step 404 includes portions of content with approaching expiration times, broadcast content expiration program 400 accesses remaining portion of content through network 102 on storage device 110, and downloads the remaining portion of content to the storage device of DVR 104 (step 408). If broadcast content expiration program 400 determines that none of the portion of content from step 404 has an approaching expiration time, then broadcast content expiration program 400 makes no adjustments.

In some examples of broadcast content expiration program 400, when the beginning portion of broadcast content that is stored on DVR 104 has an expiration date for downloading the segment of broadcast content in its entirety, the remainder of the associated segment of broadcast content will be retrieved before it is no longer available for download. This ensures that user will always be able to watch desired content in its entirety. In one example, broadcast content expiration program 400 runs once per day, and determines if content includes metadata with an expiration time(s) not found on the previous day. In examples, user may define the parameters of how often broadcast content expiration program 400 runs, and how close the expiration time is before the entire version of content is downloaded.

Figure 5:
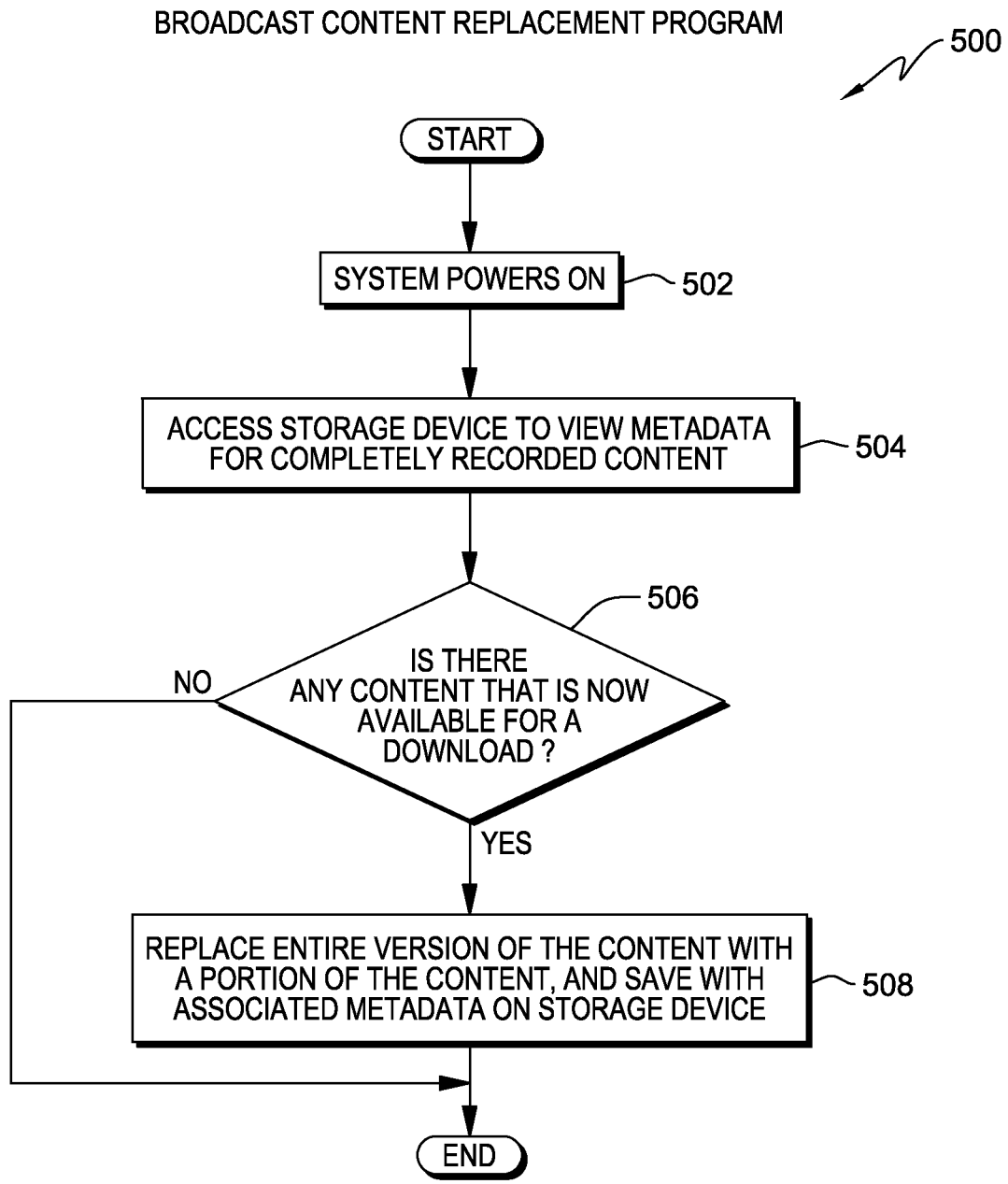
FIG. 5 is a flowchart depicting the steps of a program for replacing stored broadcast content in accordance with an embodiment of the present invention.

FIG. 5 is a flowchart of broadcast content replacement program 500. In one example, broadcast content replacement program 500 initiates when DVR 104 is powered on (step 502). In other examples, broadcast content replacement program 500 initiates in response to user input. Once DVR 104 is powered on, broadcast content replacement program 500 accesses metadata associated with the completely recorded content (step 504). In decision step 506, broadcast content replacement program 500 uses metadata accessed in step 504 to determine if any of the completely recorded content is now available to be downloaded through network 102. If broadcast content replacement program 500 determines that there is content from step 504 that is now available for download, broadcast content replacement program 500 replaces the complete version of the content with the beginning portion of the content, and saves the beginning portion of the content on the storage device of DVR 104 along with the associated metadata (step 508). If broadcast content replacement program 500 determines that none of the completely recorded content from step 504 is now available for download, then broadcast content replacement program 500 makes no adjustments.

In another example, broadcast content replacement program 500 determines whether any of the completely recorded content on examples of storage devices of DVRs 104 is now able to be downloaded and therefore only the beginning portion of the content may be saved on examples of storage devices of DVRs 104. On some occasions, when content is aired for the first time, providers 106 do not make content available for download for a period of time. When providers 106 do not make content available for download for a period of time, broadcast content replacement program 500 is aware of the need to store the full version of broadcast content initially, but when the broadcast content is available for download, broadcast content replacement program will only store a portion of content on the storage device of DVR 104. In one example, this broadcast content replacement program 500 could run once per day. An embodiment of the invention is that the user may define the parameters of how often they want broadcast content replacement program 500 to run.

Figure 6:
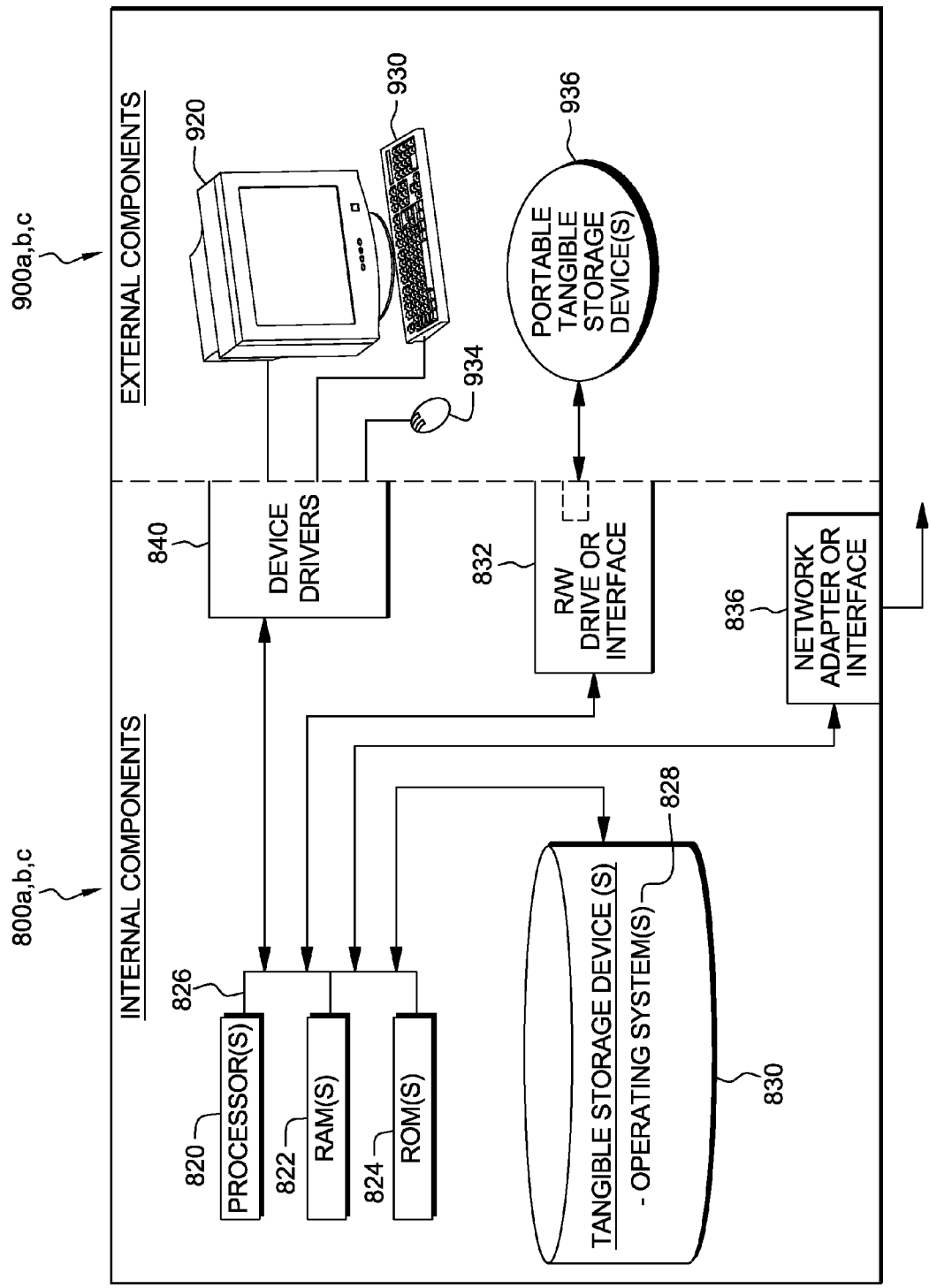
FIG. 6 is a block diagram of components of computers depicted in accordance with an embodiment of the present invention.

DVR 104 may include respective sets of internal components 800a, b, c, d and external components 900a, b, c, d illustrated in FIG. 6. Each of the sets of internal components 800a, b, c, d includes one or more processors 820, one or more computer-readable RAMs 822 and one or more computer-readable ROMs 824 on one or more buses 826 and one or more operating systems 828 and one or more computer-readable tangible storage devices 830. The one or more operating systems 828 and programs 200, 300, 400, and 500 in DVR 104 are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a, b, c* also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 200, 300, 400, and 500 can be stored on one or more of the respective portable computer-readable tangible storage devices 936, read via the respective R/W drive or interface 832 and loaded into the respective hard drive 830.

Each set of internal components 800*a, b, c* also includes network adapters or interfaces 836 such as a TCP/IP adapter cards, wireless wi-fi interface cards, or 3G or 4G wireless interface cards or other wired or wireless communication links. The programs 200, 300, 400 and 500 can be downloaded on DVR 104 or other computing device from an external computer via a network (for example, the Internet, a local area network or other, wide area network) and respective network adapters or interfaces 836. From the network adapters or interfaces 836, the programs 200, 300, 400 and 500 are loaded into the respective hard drive 830. The network may comprise copper wires, optical fibers, wireless transmission, routers, firewalls, switches, gateway computers and/or edge servers.

Each of the sets of external components 900*a, b, c* can include a computer display monitor 920, a keyboard 930, and a computer mouse 934. External components 900*a, b, c* can also include touch screens, virtual keyboards, touch pads, pointing devices, and other human interface devices. Each of the sets of internal components 800*a, b, c* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Programs 200, 300, 400 and 500 can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of programs 200, 300, 400 and 500 can be implemented in whole or in part by computer circuits and other hardware (not shown). Based on the foregoing, computer system, method and program product have been disclosed for recording and replaying broadcast content. However, numerous modifications and substitutions can be made without deviating from the scope of the present invention. Therefore, the present invention has been disclosed by way of example and not limitation.

What is claimed is:

1. A method for recording and replaying broadcast content, the method comprising the steps of:
a computer receiving broadcast content through a receiver;
the computer receiving a request from a user to record a segment of the broadcast content;
the computer determining whether metadata associated with the segment of broadcast content includes a location from which the segment can be retrieved at a subsequent time;
responsive to determining that the metadata includes the location from which the segment can be retrieved, the computer recording a first portion of the segment of broadcast content, the computer storing the first portion of the segment of broadcast content in a database;
the computer accessing metadata associated with the first portion of the segment of broadcast content stored in the database;
the computer referencing the metadata;
responsive to the computer referencing the metadata, the computer determining that the first portion of the segment of broadcast content has an approaching retrieval expiration time; and
the computer storing the remaining portion of the segment of broadcast content in the database by associating the remaining portion of the segment of broadcast content with the first portion of the segment of broadcast content.

2. The method of claim 1, further comprising the steps of:
the computer determining the bandwidth of the network connection; and
the computer adjusting the length of the first portion of the segment of broadcast content stored in the database depending on the bandwidth of the network connection.

3. The method of claim 1, wherein the first portion of the segment of broadcast content stored in the database is a beginning portion of the segment of broadcast content.

4. The method of claim 1, wherein the portion of broadcast content stored on the database is defined by the user to begin at a predetermined point in the segment of broadcast content.

5. The method of claim 1, further comprising the steps of:
the computer receiving a request from the user to play the segment of broadcast content;
responsive to the request to play the segment of broadcast content, the computer retrieving the first portion of the segment of broadcast content from the database and playing the first portion of the segment of broadcast content; and
the computer retrieving a remaining portion of the segment of broadcast content not previously recorded through a network connection.

6. The method of claim 5, wherein the computer is simultaneously playing the first portion of the segment of broadcast content, and downloading the remaining portion of the segment of broadcast content.

7. The method of claim 1, wherein:
the computer determining whether the metadata associated with the segment of broadcast content includes the location from which the segment can be retrieved at a subsequent time; and
responsive to determining that the metadata does not include the location from which the segment can be retrieved, the computer recording the segment of broadcast content, and the computer storing the segment of broadcast content in the database.

8. The method of claim 7, further comprising the steps of:
the computer accessing metadata associated with the segment of broadcast content stored in the database;
the computer determining whether the segment of broadcast content is now available for retrieval by referencing the metadata associated with the segment of broadcast content stored in the database; and responsive to the computer referencing the metadata, the computer determining the segment of broadcast content with an available download link, and the computer saving the first portion of the segment of broadcast content in the database with the associated metadata.

9. A computer program product for recording and replaying broadcast content, the computer program product comprising:
 one or more computer-readable, tangible storage devices;
 program instructions, stored on at least one of the one or more storage devices, to receive broadcast content through a receiver;
 program instructions, stored on at least one of the one or more storage devices, to receive a request from a user to record a segment of the broadcast content;
 program instructions, stored on at least one of the one or more storage devices, to determine whether the metadata associated with the segment of broadcast content includes a location from which the segment can be retrieved at a subsequent time;
 program instructions, stored on at least one of the one or more storage devices, responsive to determining that the metadata includes the location from which the segment can be retrieved, to record a first portion of the segment of broadcast content, and to store the first portion of the segment of broadcast content in a database;
 program instructions stored on at least one of the one or more storage devices, to access metadata associated with the first portion of the segment of broadcast content stored in the database;
 program instructions stored on at least one of the one or more storage devices, to reference the metadata;
 program instructions stored on at least one of the one or more storage devices, responsive to the metadata referencing, to determine that the first portion of the segment of broadcast content has an approaching retrieval expiration time; and
 program instructions stored on at least one of the one or more storage devices, to store the remaining portion of the segment of broadcast content in the database by associating the remaining portion of the segment of broadcast content with the first portion of the segment of broadcast content.

10. The computer program product in claim 9, further comprising:
 program instructions, stored on at least one of the one or more storage devices, to determine the bandwidth of the network connection; and
 program instructions, stored on at least one of the one or more storage devices, to adjust the length of the first portion of the segment of broadcast content stored in the database depending on the bandwidth of the network connection.

11. The computer program product of claim 9, wherein the program instructions to store the first portion of the segment of broadcast content in the database is a beginning portion of the segment of broadcast content.

12. The computer program product of claim 9, wherein the program instructions to record a first portion of the segment of broadcast content is defined by the user to begin at a predetermined point in the segment of broadcast content.

13. The computer program product of claim 9, further comprising:
 program instructions, stored on at least one of the one or more storage devices, to receive a request from the user to play the segment of broadcast content;
 program instructions, stored on at least one of the one or more storage devices, responsive to the request to play the segment of broadcast content, to retrieve the first portion of the segment of broadcast content from the database and play the first portion of the segment of broadcast content; and
 program instructions, stored on at least one of the one or more storage devices, to retrieve a remaining portion of the segment of broadcast content not previously recorded through a network connection.

14. The computer program product of claim 13, wherein the program instructions to retrieve the first portion of the segment of broadcast content from the database and retrieve the remaining portion of the segment of broadcast content simultaneously play the first portion of the segment of broadcast content, and download the remaining portion of the segment of broadcast content.

15. The computer program product of claim 9, wherein the program instructions to determine whether the metadata associated with the segment of broadcast content includes the location from which the segment can be retrieved at a subsequent time; and
 program instructions, responsive to determining that the metadata does not include the location from which the segment of broadcast content can be retrieved, to record the segment of broadcast content, and to store the segment of broadcast content in the database.

16. The computer program product of claim 15, further comprising:
 program instructions stored on at least one of the one or more storage devices, to access metadata associated with the segment of broadcast content stored in the database;
 program instructions stored on at least one of the one or more storage devices, to determine whether the segment of broadcast content is now available for retrieval by referencing the metadata associated with the segment of broadcast content stored in the database; and
 program instructions stored on at least one of the one or more storage devices, responsive to the metadata referencing, to determine the segment of broadcast content with an available download link, and to save the first portion of the segment of broadcast content in the database with the associated metadata.

17. A computer system for recording and replaying broadcast content, the computer system comprising:
 one or more processors, one or more computer-readable memories and one or more computer-readable, tangible storage devices;
 program instructions, stored on at least one of the one or more storage devices for execution by at least one of the one or more processors via at least one of the one or more memories, to receive broadcast content through a receiver;
 program instructions, stored on at least one of the one or more storage devices for execution by at least one of the one or more processors via at least one of the one or more memories, to receive a request from a user to record a segment of the broadcast content;
 program instructions, stored on at least one of the one or more storage devices for execution by at least one of the one or more processors via at least one of the one or more memories, to determine whether the metadata associated with the segment of broadcast content includes a location from which the segment can be retrieved at a subsequent time;

program instructions, stored on at least one of the one or more storage devices for execution by at least one of the one or more processors via at least one of the one or more memories, responsive to determining that the metadata includes the location from which the segment can be retrieved, to record a first portion of the segment of broadcast content, and to store the first portion of the segment of broadcast content in a database;

program instructions, stored on at least one of the one or more storage devices for execution by at least one of the one or more processors via at least one of the one or more memories, to access metadata associated with the first portion of the segment of broadcast content stored in the database;

program instructions, stored on at least one of the one or more storage devices for execution by at least one of the one or more processors via at least one of the one or more memories, to reference the metadata;

program instructions, stored on at least one of the one or more storage devices for execution by at least one of the one or more processors via at least one of the one or more memories, responsive to the metadata referencing, to determine that the first portion of the segment of broadcast content has an approaching retrieval expiration time; and program instructions, stored on at least one of the one or more storage devices for execution by at least one of the one or more processors via at least one of the one or more memories, to store the remaining portion of the segment of broadcast content in the database by associating the remaining portion of the segment of broadcast content with the first portion of the segment of broadcast content.

18. The computer system of claim 17, further comprising the steps of:

program instructions, stored on at least one of the one or more storage devices for execution by at least one of the one or more processors via at least one of the one or more memories, to determine the bandwidth of the network connection; and program instructions, stored on at least one of the one or more storage devices for execution by at least one of the one or more processors via at least one of the one or more memories, to adjust the length of the first portion of the segment of broadcast content stored in the database depending on the bandwidth of the network connection.

19. The computer system of claim 17, wherein the program instructions to store the first portion of the segment of broadcast content in the database is a beginning portion of the segment of broadcast content.

20. The computer system of claim 17, wherein the program instructions to record a first portion of the segment of broadcast content is defined by the user to begin at a predetermined point in the segment of broadcast content.

21. The computer system of claim 17, further comprising:

program instructions, stored on at least one of the one or more storage devices for execution by at least one of the one or more processors via at least one of the one or more memories, to receive a request from the user to play the segment of broadcast content;

program instructions, stored on at least one of the one or more storage devices for execution by at least one of the one or more processors via at least one of the one or more memories, responsive to the request to play the segment of broadcast content, to retrieve the first portion of the segment of broadcast content from the database and play the first portion of the segment of broadcast content; and program instructions, stored on at least one of the one or more storage devices for execution by at least one of the one or more processors via at least one of the one or more memories, to retrieve a remaining portion of the segment of broadcast content not previously recorded through a network connection.

22. The computer system of claim 21 wherein the program instructions to retrieve the first portion of the segment of broadcast content from the database and retrieve the remaining portion of the segment of broadcast content simultaneously play the first portion of the segment of broadcast content, and download the remaining portion of the segment of broadcast content.

23. The computer system of claim 17, wherein the program instructions to determine whether the metadata associated with the segment of broadcast content includes the location from which the segment can be retrieved at a subsequent time; and program instructions, responsive to determining that the metadata does not include the location from which the segment of broadcast content can be retrieved, to record the segment of broadcast content, and to store the segment of broadcast content in the database.

24. The computer system of claim 23, further comprising:

program instructions, stored on at least one of the one or more storage devices for execution by at least one of the one or more processors via at least one of the one or more memories, to access metadata associated with the segment of broadcast content stored in the database;

program instructions, stored on at least one of the one or more storage devices for execution by at least one of the one or more processors via at least one of the one or more memories, to determine whether the segment of broadcast content is now available for retrieval by referencing the metadata associated with the segment of broadcast content stored in the database; and program instructions, stored on at least one of the one or more storage devices for execution by at least one of the one or more processors via at least one of the one or more memories, responsive to the metadata referencing, to determine the segment of broadcast content with an available download link, and to save the first portion of the segment of broadcast content in the database with the associated metadata.

* * * * *